UNITED STATES PATENT OFFICE.

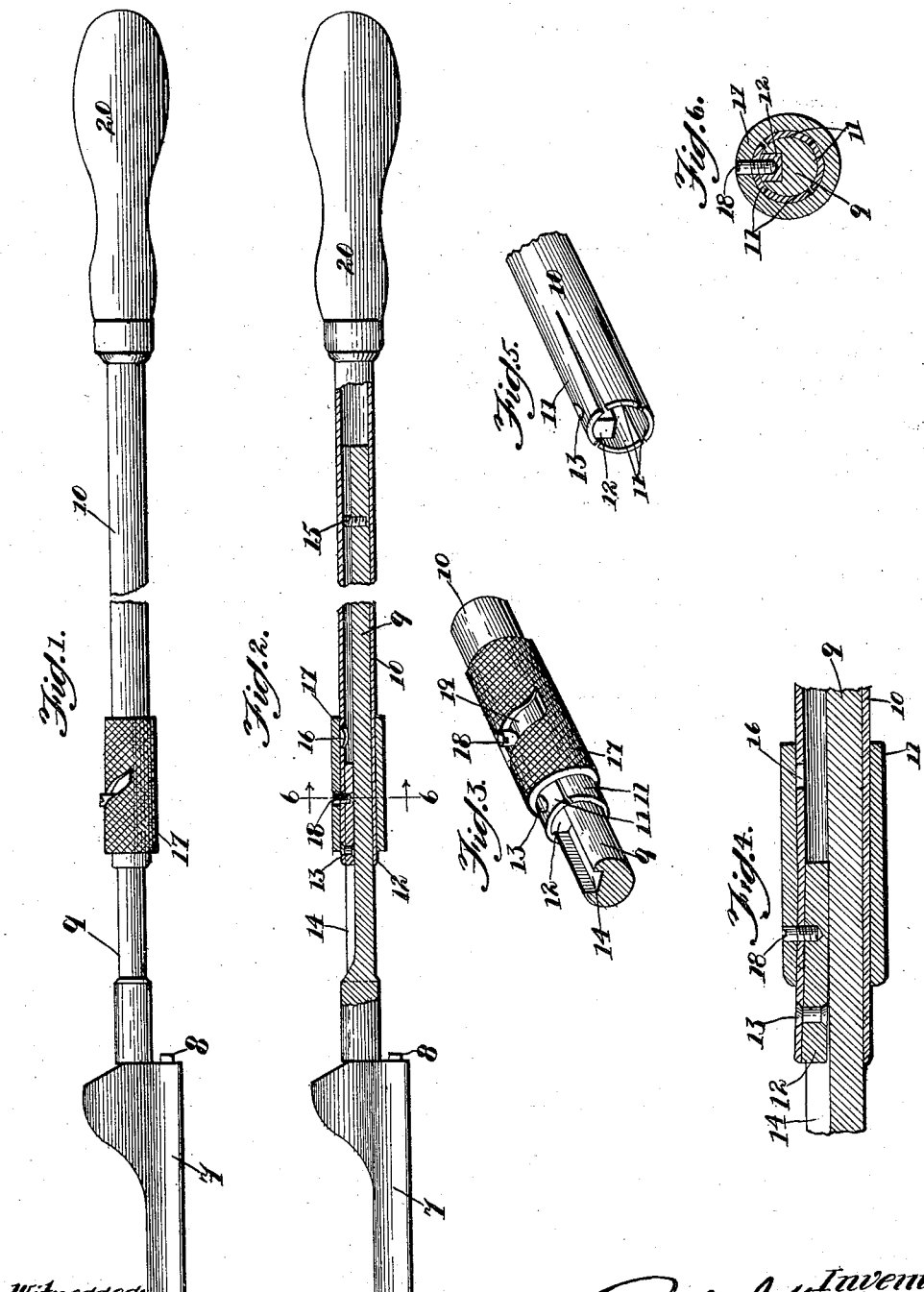

PAUL J. WEDER, OF CHICAGO, ILLINOIS, ASSIGNOR TO FIRM OF SHARP & SMITH, OF CHICAGO, ILLINOIS.

VETERINARY SURGEON'S FLOAT.

SPECIFICATION forming part of Letters Patent No. 703,869, dated July 1, 1902.

Application filed February 19, 1902. Serial No. 94,752. (No model.)

*To all whom it may concern:*

Be it known that I, PAUL J. WEDER, a citizen of the United States, residing at Chicago, in the county of Cook and State of Illinois, have invented certain new and useful Improvements in Veterinary Surgeons' Floats, of which the following is a specification, reference being had to the accompanying drawings.

This invention relates to improvements in veterinary surgeons' instruments of the type known as "floats." It is highly desirable in instruments of this character that the handle be made adjustable, so as to more perfectly adapt the instrument for work upon different teeth, as well as to enable it to be shortened into the smallest possible limits, so as to be in more compact form for transportation. It is of importance that the handle when adjusted to the desired position for work be held absolutely rigid, so as to prevent turning axially or being moved endwise.

It is the object of my invention to provide a device of this character, and I attain such object by the combinations of devices illustrated in the drawings and hereinafter described, and those things which I believe to be new will be pointed out in the claims.

Referring to the accompanying drawings, Figure 1 is a side elevation, the handle being partly broken away. Figure 2 is a longitudinal vertical section, the end portions of the instrument being in elevation. Fig. 3 is a detail, being a perspective view of a portion of the handle and the locking means. Fig. 4 is a longitudinal vertical section of the parts shown in Fig. 3. Fig. 5 is a detail, being a perspective view of the outer end of the tubular portion of the handle; and Fig. 6 is a cross-section, enlarged, taken at line 6 6 of of Fig. 2.

Referring to the several figures of the drawings, in which corresponding parts are indicated by the same reference-numerals, 7 indicates a rasp-holder, the details of construction of which are not represented, but which may be of any suitable character.

8 indicates the projecting end of a rasp held within the holder. The handle bar or rod consists of two portions—a shank or stem 9 and a tube 10, the shank or stem being provided on its outer end with suitable means for attachment to the holder 7 and such shank or stem being of a diameter to adapt it to fit and move within the tube 10. The outer end of the tube 10 is slit in a number of places, forming thereby a plurality of lips 11, upon the inner face of one of which is secured a block 12. Such block may be secured by a suitable rivet 13 or in any other suitable manner.

14 indicates a long channel or groove extending longitudinally of the stem or shank 9 and of a width to adapt it to receive the block 12, independent rotation of either the stem or shank 9 or the tube 10 being prevented when said block is within the channel or groove 14.

15 indicates a stop located within and near the rear end of the groove or channel 14 and adapted when the stem or shank is drawn out to abut against the rear end of the block 12, and so prevent the disconnection of said stem or shank and its surrounding tube. In the form of construction shown this stop 15 is in the form of a screw, which enters a screw-threaded opening adapted for it in the stem or shank and is placed in position after the end of the stem or shank has been passed into the tube 10 through a small hole 16, formed in the tube 10 just in rear of the end of the block 12.

17 indicates a sleeve fitted over the tube 10 near its forward end and held in place by a screw or pin 18 passing through one of the lips 11, and in the construction shown and for greater strength passing also into the block 13. The head of this pin or screw 18 projects above the surface of the tube 10 and lies within a spiral slot 19, formed in the sleeve 17. The block 12 is very slightly inclined, being thicker at its outer than at its inner end, and by bringing pressure to bear at the forward portion, so as to force such block down against the bottom of the channel or groove 14, a frictional engagement will be had between the parts 9 and 10 sufficient to hold them in a locked position, and pressure of this character is caused by turning the sleeve 17, so that it will, by reason of the engagement of its slot with the screw or pin 18, be caused to move forward, bringing the lips firmly against the stem or shank and forcing the block very tightly against the bottom of the channel or groove 14.

To readjust the parts to make the handle shorter or longer, the sleeve is given a reverse turn, withdrawing it from the ends of the lips, thereby relieving the block from such close frictional engagement with the stem or shank, after which the parts can be set as desired and in the same manner as described again locked.

The sleeve 17 has its outer surface roughened or corrugated, as indicated in the drawings, to enable it to be more firmly grasped by the user. This sleeve also acts at all times to completely cover the holes 16 in the tube 10, through which the screw 15, that serves as a stop, is placed in position, and when it is desired to disconnect the parts for any reason the screw 18 will be removed, allowing the sleeve to be drawn back to expose the hole 16.

By my invention I provide very cheap and simple means for permitting the handle to be changed in length to adapt it for different operations and also that enables it to be reduced in size to the minimum for convenience in carrying, and I also provide very effective means for holding the several parts of the handle in unyielding engagement with each other.

That which I claim as my invention, and desire to secure by Letters Patent, is—

1. In a handle, the combination with a tubular portion having its outer end slit to form lips, and a block secured on the inner face of one of said lips, of a stem or shank in said tubular portion adapted to be moved longitudinally thereof, said stem or shank having a longitudinal channel or groove and said block being slidable in said channel or groove whereby considerable adjustment of said tubular portion and stem or shank is obtained, a movable sleeve surrounding said tubular portion and provided with an inclined slot, and a projection on said tubular portion that enters said slot, substantially as specified.

2. In a handle, the combination with a tubular portion having at its outer end a lip, and a block on the under face of said lip, said combined lip and block being thicker at the outer end than at the inner end, of a stem or shank in said tubular portion adapted to be moved longitudinally thereof, said stem or shank having a longitudinal channel or groove and said block being slidable in said channel or groove whereby considerable adjustment of said tubular portion and stem or shank is obtained, and a movable sleeve surrounding said tubular portion and adapted to force said block tightly into said channel or groove, substantially as specified.

3. In a handle, the combination with a tubular portion having its outer end slit to form lips, and a block thicker at its outer end than at its inner end secured to the inner face of one of the lips, of a stem or shank in said tubular portion and adapted to be moved longitudinally thereof, said stem or shank having a longitudinal channel or groove adapted to receive said block, a removable stop in said channel or groove near the rear end thereof, and a movable sleeve surrounding said tubular portion and adapted to force said block tightly into said channel and serving also as a cover for an opening in the tubular portion through which the said stop is adapted to be entered and removed, substantially as specified.

PAUL J. WEDER.

Witnesses:
JOHN L. JACKSON,
ALBERT H. ADAMS.